United States Patent
Stephenson

(10) Patent No.: US 6,174,237 B1
(45) Date of Patent: Jan. 16, 2001

(54) METHOD FOR A GAME OF SKILL TOURNAMENT

(76) Inventor: John H. Stephenson, 4608 S. Knoxville, Tulsa, OK (US) 74135

( * ) Notice: Under 35 U.S.C. 154(b), the term of this patent shall be extended for 0 days.

(21) Appl. No.: 09/316,840

(22) Filed: May 21, 1999

(51) Int. Cl.[7] .............................. A63F 13/00; A63F 9/24; G06F 17/00; G06F 19/00
(52) U.S. Cl. ................................ 463/42; 463/25; 463/40; 434/322; 434/332; 700/90; 700/91; 700/92
(58) Field of Search .................................. 463/42, 40, 43, 463/9, 10, 11, 12, 14, 25, 29, 30; 434/322, 323, 324, 332, 350; 700/90, 91, 92, 93

(56) References Cited

U.S. PATENT DOCUMENTS

| | | | |
|---|---|---|---|
| 4,593,904 | * | 6/1986 | Graves ............................... 273/1 E X |
| 4,666,160 | * | 5/1987 | Hamilton ............................... 273/242 |
| 4,669,730 | * | 6/1987 | Small ............................ 273/138 A X |
| 4,926,327 | * | 5/1990 | Sidley ............................. 364/412 X |
| 5,038,022 | * | 8/1991 | Lucero ............................. 235/380 X |
| 5,083,271 | * | 1/1992 | Thacher et al. .................. 364/411 X |
| 5,114,155 | * | 5/1992 | Tillery et al. ..................... 273/371 X |
| 5,429,361 | * | 7/1995 | Raven et al. ..................... 273/138 A |
| 5,454,570 | | 10/1995 | Karal .................................... 273/292 |
| 5,513,117 | * | 4/1996 | Small ................................ 364/479 X |
| 5,518,249 | | 5/1996 | Sines et al. .......................... 273/304 |
| 5,544,892 | * | 8/1996 | Breeding ........................... 273/292 |
| 5,546,523 | * | 8/1996 | Gatto ................................. 395/156 X |
| 5,549,300 | | 8/1996 | Sardarian ............................. 273/292 |
| 5,566,946 | | 10/1996 | Parker ................................. 273/292 |
| 5,593,349 | * | 1/1997 | Miguel et al. ....................... 463/30 X |
| 5,643,088 | * | 7/1997 | Vaughn et al. ...................... 463/40 X |
| 5,649,705 | | 7/1997 | String .................................... 273/292 |
| 5,660,391 | | 8/1997 | Klasee ................................. 273/292 |
| 5,660,392 | | 8/1997 | Hansen ................................ 273/292 |
| 5,743,532 | | 4/1998 | Lafferty ............................... 273/292 |
| 5,755,621 | | 5/1998 | Marks et al. .......................... 463/42 |
| 5,768,382 | * | 6/1998 | Schneier et al. ................... 380/23 X |
| 5,816,918 | * | 10/1998 | Kelly et al. .............................. 463/16 |
| 5,836,586 | | 11/1998 | Marks et al. .......................... 273/292 |
| 5,902,983 | * | 5/1999 | Crevelt et al. .................... 235/380 X |
| 5,944,316 | * | 8/1999 | Hernandez ........................... 273/292 |
| 5,970,143 | * | 10/1999 | Schneier et al. ................... 380/23 X |
| 6,019,374 | * | 2/2000 | Breeding ......................... 273/292 X |
| 6,048,271 | * | 4/2000 | Barcelou ............................ 463/48 X |

* cited by examiner

Primary Examiner—Michael O'Neill
Assistant Examiner—Binh-An Nguyen
(74) Attorney, Agent, or Firm—Head, Johnson & Kachigian

(57) ABSTRACT

A method for a game of skill tournament that is challenging and provides the player a reliable gauge of his skill level as compared to other players. The tournament has a qualifying round and a playoff round, and is played over an interactive computer system. In the qualifying round, a player competes against a host computer. The object of this round is to score a sufficient number of points to qualify for the highest level of performance possible. Once a player obtains a level of performance, he is recognized for his accomplishment and given a reward. This allows the player to gauge his skill level. In the playoff round, those players reaching a predetermined level of performance, play the same game simultaneously against the host computer under the same rules and conditions for a set amount of time. At the end of this time frame, the results are analyzed. Those players with the highest point totals will be recognized and given a reward.

19 Claims, 1 Drawing Sheet

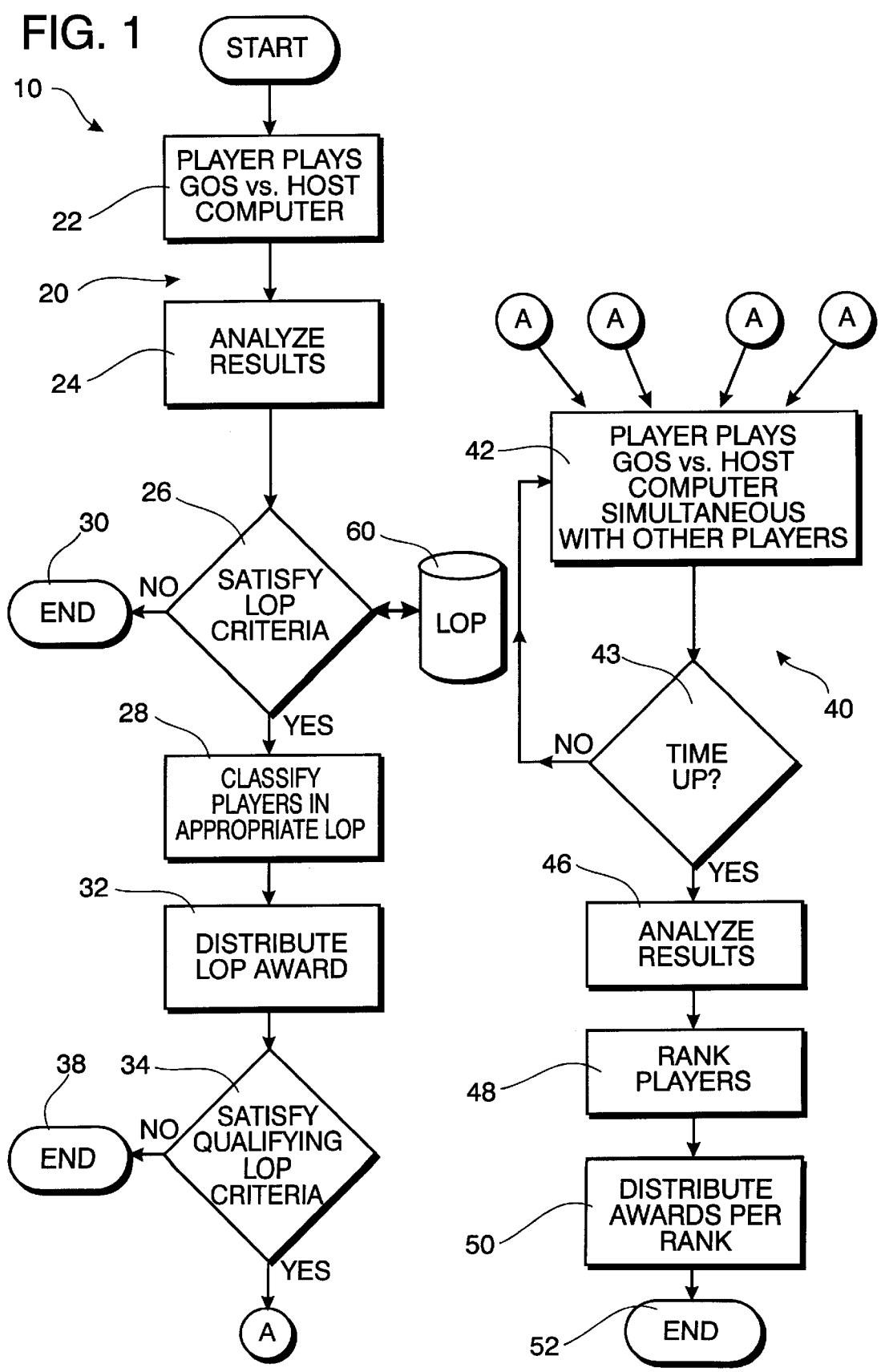

METHOD FOR A GAME OF SKILL TOURNAMENT

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

The present invention is directed to a game of skill tournament. Specifically, the present invention is directed to a tournament having a qualifying round and a playoff round, and played on an interactive computer system. The qualifying round is played between a player through a computer terminal and a host computer. The playoff round is played between those players which have obtained a predetermined level of performance and the host computer. This round is played under the same rules and conditions as in the qualifying round except all the players are playing simultaneously within a specific time frame on a specific date.

Interactive video computer software, the Internet and the public's fascination with the challenge, competitiveness and gratification of computer based video games has increased the need for new games and gaming formats. There exists the need for a gaming format which allows a player to gauge the level of skill he possess as compared to other players, without traveling long distances and incurring the expenses of meeting at a central contest site.

For many years, games of skill, such as chess, bridge, poker and blackjack, have attracted tournaments. Various types of tournaments have been created and attempted to satisfy the above mentioned needs. These tournaments involve games such as poker and blackjack. Typically, various rules have been placed upon the individual game. Examples of such attempts are described:

U.S. Pat. No. 5,660,392 to Hansen involves a method for playing a blackjack type card game having specific rules regarding the play of the game; U.S. Pat. No. 5,660,391 to Klasse involves a method for playing blackjack where a player wagers whether a hand will be a Blackjack, 21, 20, 19 or 18; U.S. Pat. No. 5,566,946 to Parker involves a method to play blackjack where different bets are placed on the Ante and the Play with different odds being placed on same.

U.S. Pat. No. 5,755,621 to Marks involves a poker card tournament where a player creates a poker hand by first receiving a pair of cards, discarding one of the card and repeating the process until the hand has been completed. This tournament is played solely between the player and the house computer system or between other players.

The prior art game of skill games or tournaments have not been successful. These references do not allow a player to gauge his level of performance by allowing the player to test his skill and ability against the tournament sponsor and other players during the same tournament. There is a need for a tournament which allows for a player to compete and obtain a reliable index as to his skill as compared to other competitors competing under the same game conditions while simultaneously enjoying the game.

BRIEF SUMMARY OF THE INVENTION

In accordance with the present invention a game of skill tournament having a qualifying round and a playoff round, being played over an interactive computer system, is disclosed. Generally, the qualifying round is played between a single player and a host computer. The playoff round is played between those players that have obtained a predetermined level of performance during the qualifying round. Awards are distributed to those players who reach specific levels of performance during the qualifying round and to the top scorers of the playoff round.

For purposes of the present invention, a game of skill is defined as any game where a player's knowledge and experience influences the outcome of the game. Examples of games of skill include but are not limited chess, poker, bridge, hearts, blackjack and question/answer trivia games.

The game of skill tournament is divided into two distinct portions: the qualifying round and the playoff round. The qualifying round is played between a single player through a computer terminal and a host computer. The host computer has the ability to act as a game sponsor by keeping score, operating the game, monitoring the player's progress and to distribute awards when appropriate. Also, the host computer has the ability to act as another player if the game requires more than a single player. The object of the qualifying round is to obtain a level of performance that will allow a player to participate in the playoff round. Awards are given to those players reaching various levels of performance during the qualifying round and to the top scorers during the playoff round.

With respect to the levels of performance, there are a plurality of levels ranging from low-performance to high-performance. Typically, there would be a low-performance level, one or more mid-performance levels and a high-performance level.

If a player obtains a result while playing a game of skill during the qualifying round which satisfies a predetermined criteria specific to a level of performance, the player would then be classified a player of that level and would be given an award specific to that level.

If a player obtains a result that qualifies him to be classed into a level of performance that qualifies him to be able to participate in the playoff round, he would be eligible to play the game of skill against the host computer in the playoff round. During the playoff round, all players which obtained a specific level of performance would simultaneously play the game of skill against the host computer under the same rules and conditions as during the qualifying round, except for a specific time limit. Typically, the levels of performance which qualify a player for the playoff round are the highest most levels.

After the time limit for the playoff round ends, the results are evaluated, with the players being ranked according to the number of point each obtained during the playoff round. Awards are distributed to those players reaching a predetermined ranking. For example, the winner, second place and third place players will each receive different awards.

The game of skill tournament can be played over an electronic system, such as a local area network (LAN), wide area network (WAN), campus-wide network, fixed based unit network, Intranet or Internet.

The primary object of the present invention is to create a game of skill tournament which improves upon the prior art tournaments.

Another object of the present invention is to create a game of skill tournament which challenges the participants and reward those participants who obtain a certain level of performance.

Other objects and a further scope of the applicability of the present invention will become apparent from the detailed

DESCRIPTION OF THE DRAWINGS

FIG. 1 is a flow chart of the preferred embodiment of the present invention.

DETAILED DESCRIPTION OF THE PREFERRED EMBODIMENTS

In accordance with an exemplary embodiment of the present invention as shown in FIG. 1, a method directed toward a game of skill tournament 10 having a qualifying round 20 and a playoff round 40 is generally disclosed. A least one player participates in the qualifying round 20 against a host computer. The playoff round 40 is played by those players that have obtained a predetermined level of performance during the qualifying round 20 against the host computer. Awards are distributed to those players who reach specific levels of performance during the qualifying round and to those players in the playoff round who obtain a predetermined rank. The awards can be distributed either instantaneous or can be made available to be received by the recipient at some time in future.

The game of skill tournament first begins with at least one player playing a game of skill against the host computer in the qualifying round 20 as shown in box 22. The maximum number of participants during the qualifying round 20 is open-ended. The only restriction on the number of participants would be specific to the particular game of skill being played. The game of skill can be any game of skill that requires the player to utilize his knowledge and experience to affect the outcome of the game. Examples of games of skill include but are not limited to games, card games and strategy games. Card games can include: rummy, gin rummy, poker, bridge, pinochle, bezique, piquet, klaberjass, julepe, boure, cribbage, casino, euchre, napoleon, two hand five hundred, spoil five, ecarte, hearts, cans, seven-up, draw seven, auction pitch, blackjack, pontoon, fifteen, van john, seven and a half, ten and half, pong, maco, chemin de fer, baccarat, skin game, horse race, eights, sharnery, sharney gin, doctor videtti, tableanette, and solitaire. Trivia games can include games relating to: geography, history, motion pictures, science, the Bible, literature, fictional writings, nonfictional writings, musicians, writers, composers, actors, statesmen, military battles, military leaders, mathematical problems, mathematical formulas, fine arts, horticulture, agriculture, medicine, television shows, spelling, phrase origins, word origins, science-fiction, sporting events, athletics, anatomy and astronomy. Strategy games can include: crossword puzzles, word search, word scramble, word match, chess, maze games, computer-generated sporting games, player participation sports including but not limited to virtual sporting events, video sporting events and computer-based sporting events, player participation virtual reality games, player participation action games, dominos, checkers, pinball and foosball trivia.

The object of the qualifying round 20 is to obtain a sufficient number of points during the course of play which satisfies a predetermined criteria for a level of performance. Qualifying round 20 can be only a single game or a series of games. Once a player has obtained sufficient points which would classify him in the top most level of performance, the player would not have to continue with the game or games.

Once the player completes his play against the host computer, the results are analyzed, as shown in box 24. The results are compared to a predetermined list of levels of performance 60, as shown in box 26. If the results satisfy predetermined criteria, the player will be classified into the level of performance that matches his results, as shown in box 28. If the player's results do not meet a minimum level of performance, the player will be eliminated from the tournament will be terminated, as shown in box 30. If a player is classified into a level of performance, an award specific to the specific level of performance is distributed to the player, as shown in box 32.

If a player is eliminated from the tournament, he has the ability to begin a new qualifying round. The reasons for beginning a new qualifying round include attempting to qualify for the minimum level of performance, qualifying for a higher level of performance and to receive additional rewards.

If a player is classified into a level of performance that would qualify him to participate in the playoff round 40, the player will advance, as shown in box 34. Typically, these qualifying levels of performance are reserved for the highest most levels of performance. If the player's level of performance does not meet the predetermined qualifying level of performance, the player will be eliminated from the tournament, as shown in box 38. As mentioned above, the player would be able to begin a new qualifying round in order to attempt to reach a level of performance that would allow him to participate in the playoff round 40.

Typically the qualifying round is played in a continuous manner. By this it is meant that the player selects the day and time in which to participate. The only limitations to this time frame is if the qualifying round is not active. An example of this is illustrated as follows: The tournament is open for qualifying round play from Monday at noon to Saturday at midnight. Any player would have the ability to participate in the qualifying round at the time of his choice as long as it was between the pre-established time frame.

The playoff round 40 will begin at a preset time with those player who have qualified by a specific cut-off date and time playing the game of skill against the host computer, as shown in box 42. The playoff round will continue for a preset amount of time, as shown in step 43. After the playoff round has concluded, the results are analyzed, as shown in step 46. The results are analyzed to determine the each player's rank. The players are ranked according to performance, as shown in step 48. An award is then distributed to those players which have reached a predetermined rank, as shown in step 50. The tournament then end as shown in step 52.

EXAMPLE OF PREFERRED EMBODIMENT

An example of the preferred embodiment of the present invention is set forth below. The parameters of the example are for illustrative purposes only. They are not intended to limit the scope of the invention. The game of skill will be set as Hearts. The tournament will be played over the Internet, where the host computer and participants' terminals are each in different locations. The qualifying round is open for play seven days a week, twenty-four hours per day. The playoff round is to played on each Saturday from 6 p.m. to 8 p.m. GMT. The playoff qualifying cutoff date and time is Saturday at noon, GMT.

The predetermined levels of performance are set out below in Table 1.

TABLE 1

| Level | Minimum Points | Award |
| --- | --- | --- |
| Bronze | 200 | X |
| Silver | 300 | 2X |
| Gold | 400 | 3X |
| Platinum | 500 | 4X |

Points are earned based on winning rounds of play. The qualifying levels of performance include the Gold and Platinum levels. Four players start the qualifying round against the host computer. Since the tournament is played over the Internet, each player is able to participate at a variety of locations at the time of their choosing prior to noon on Saturday.

The host computer is represented by a computer system having compatible hardware and software. The location of the host computer system can be a different location than those locations of each player. Through a series of two-way communications, the game of skill is conducted between the players and the host computer system.

After each player has completed the qualifying round, the results are analyzed. The results are listed in Table 2.

TABLE 2

| Player | Score | Classification | Award | Advance |
| --- | --- | --- | --- | --- |
| A | 75 | None | None | No |
| B | 250 | Bronze | X | No |
| C | 400 | Gold | 3X | Yes |
| D | 525 | Platinum | 4X | Yes |

The results show Player A had 75 points, Player B had 250 points, Player C had 450 points and Player D had 525 points.

Player A does not satisfy the minimum level of performance. Thus, Player A is eliminated from the tournament. Player B meets the criteria for the Bronze level of performance. Player C meets the criteria for the Gold level of performance. Player D meets the criteria for the Platinum level of performance. Host computer system distributes level of performance specific awards to Players B, C and D. However, only players C and D advance to the playoff round against other qualified players of equal level.

At the predetermined time on Saturday, Player C then plays the game of skill in the playoff round against the host computer simultaneously with other Gold level players. Player D plays the game of skill in the playoff round against the host computer simultaneously with other Platinum level players. Host computer system analyzes the results the Gold and Platinum level playoff rounds. The players are then ranked according to their specific performance during the playoff round.

Assume Players C and D are ranked first and third in their respective divisions. Host computer would then distribute an award to Player C specific to his first place ranking in the Gold playoff round and an award to Player D specific to his third place ranking in the Platinum playoff round.

While the foregoing detailed description has described several embodiments of the method in accordance with the present invention, it is to be understood that the above description is illustrative only and not limiting of the disclosed invention. Thus, the invention is to be limited only by the claims as set forth below.

What is claimed:

1. A method of playing a game of skill tournament having a qualifying round and a playoff round, and played over an interactive computer system, said interactive computer system having a host computer system, a plurality of terminals computers and compatible software, said method comprising the following steps:

a. playing a game of skill in a qualifying round between a single player and the host computer;

b. evaluating the results of said qualifying round to determine if said player qualifies to be classified within a specific performance level from a plurality of performance levels ranging from a low performance level to a high performance level;

c. evaluating the results of said qualifying round to determine if said player qualifies to be classified within a qualifying performance level taken from said plurality of performance levels;

d. distributing to said player a performance level award, said performance level award being dependent upon the specific performance level obtained;

e. playing said game of skill in a playoff round between said player and the host computer simultaneously along with other players, wherein each player has been classified within a qualifying performance level;

f. evaluating the results of said playoff round to determine a tournament winner and subsequent ranking of players; and g. distributing tournament awards to tournament participants.

2. The method of claim 1 wherein said interactive computer system is selected from the group consisting of a local area network (LAN), wide area network (WAN), campus-wide network, fixed based unit network, Intranet or Internet.

3. The method of claim 1 wherein said qualifying round is defined as a plurality of individual games and the results of said qualifying round is an aggregate of the results of each individual game.

4. The method of claim 1 wherein said performance level award increases as a player qualifies for higher performance level classifications.

5. The method of claim 1 wherein said qualifying performance level as recited in subparagraph (d) is further defined as being the highest performance level.

6. The method of claim 1 wherein said plurality of performance levels is further defined as having four performance levels ranging from a low performance level to a medium-low performance level to a medium-high performance level to a high performance level.

7. The method of claim 6 wherein said qualifying performance level is further defined as being the medium-high and highest performance levels.

8. The method of claim 1 wherein said step (b) and step (c) are performed simultaneously.

9. The method of claim 1 wherein said game of skill is further defined as a card game requiring skill and knowledge.

10. The method of claim 9 wherein said card game is selected from the group consisting of rummy, gin rummy, poker, bridge, pinochle, bezique, piquet, klaberjass, julepe, boure, cribbage, casino, euchre, napoleon, two hand five hundred, spoil five, ecarte, hearts, cans, seven-up, draw seven, auction pitch, blackjack, pontoon, fifteen, van john, seven and a half, ten and a half, pong, maco, chemin de fer, baccarat, skin game, horse race, eights, sharnery, sharney gin, doctor videtti, tableanette, and solitaire.

11. The method of claim 1 wherein said game of skill is further defined as a question and answer game requiring skill and knowledge.

12. The method of claim 11 wherein said trivia game is selected from the group consisting of geography, history, motion picture, science, bible, literature, fictional writings, nonfictional writings, musicians, writers, composers, actors, statesmen, military battles, military leaders, mathematical problems, mathematical formulas, fine arts, horticulture, agriculture, medicine, television shows, spelling, phrase origins, word origins, science-fiction, sporting events, athletics, anatomy and astronomy.

13. The method of claim 1 wherein said game of skill is further defined as a strategy game requiring skill and knowledge.

14. The method of claim 13 wherein said strategy game is selected from the group consisting of crosswords, word search, word scramble, word match, chess, maze games, computer generated sporting games, player participation sports including virtual sporting events, video sporting events and computer based sporting events, player participation virtual reality games, player participation action games, dominos, checkers, pinball and foosball.

15. The method of claim 1 wherein said game of skill is based on the memory reaction of the player.

16. The method of claim 1 wherein said game of skill is based on the manual dexterity and reaction time of the player.

17. The method of claim 1 wherein said playoff round is played at a predetermined time and date.

18. The method of claim 1 wherein said playoff round is played for a predetermined amount of time.

19. The method of claim 1 wherein said player can participate in said qualifying round during a predetermined time frame.

* * * * *

UNITED STATES PATENT AND TRADEMARK OFFICE
CERTIFICATE OF CORRECTION

PATENT NO.   : 6,174,237 B1
DATED        : January 16, 2001
INVENTOR(S)  : Stephenson It is certified that error appears in the above-identified patent and that said Letters Patent is hereby corrected as shown below:

<u>Claims, page 5, column 6,</u>
Line 2, after "terminals" insert --, --;
Line 63, change "sharnery" to -- skarney --;
Line 63, change "sharney" to -- skarney --.

Signed and Sealed this

Second Day of October, 2001

Attest:

*Nicholas P. Godici*

NICHOLAS P. GODICI
*Attesting Officer*      *Acting Director of the United States Patent and Trademark Office*